No. 675,335.

Patented May 28, 1901.

C. LUKE.
PIPE COUPLING.
(Application filed Oct. 30, 1900.)

(No Model.)

Witnesses.
W. C. Lunsford.
Thomas J. Drummond.

Inventor,
Charles Luke.
by Bradley Gregory.
att'ys.

UNITED STATES PATENT OFFICE.

CHARLES LUKE, OF MILFORD, CONNECTICUT, ASSIGNOR TO THE NEW HAVEN NOVELTY MACHINE COMPANY, OF NEW HAVEN, CONNECTICUT.

PIPE-COUPLING.

SPECIFICATION forming part of Letters Patent No. 675,335, dated May 28, 1901.

Application filed October 30, 1900. Serial No. 34,876. (No model.)

*To all whom it may concern:*

Be it known that I, CHARLES LUKE, a citizen of the United States, and a resident of Milford, county of New Haven, and State of Connecticut, have invented an Improvement in Pipe-Couplings, of which the following description, in connection with the accompanying drawings, is a specification, like letters on the drawings representing like parts.

This invention relates to a novel pipe-coupling designed more especially for uniting the ends of soft-metal pipe, such as composed of lead.

My improved coupling is composed of two parts, one having an inner and the other an external thread, the part having the internal thread presenting a shoulder to support an outturned flange at the end of the pipe, the under side of said flange being seated on said shoulder by pressure exerted against the outer face of said flange by a shoulder at the inner end of the externally-threaded part of the coupling through an outturned flange of a second piece of pipe surrounded by said externally-threaded portion. For the best results, the faces of these shoulders are shaped to present an acute-angled corner, over which the pipe as it is sealed is bent, or said shoulders may be rearwardly beveled, and the pressure on the under sides of the flanges of the pipe is such as to force the faces of the flanges together with a pressure sufficient to make a gas and fluid tight joint, and so also the contact of the shoulders with the under sides of the flanges makes a gas and fluid tight joint, and the edge of the shoulder contacting with the under side of the flange as the coupling member is rotated enters and expands the flanges that their edges may also make close contact with one of the coupling members. By the coupling described it is possible to make a gas and fluid tight joint without the use of solder or packing.

Figure 1:
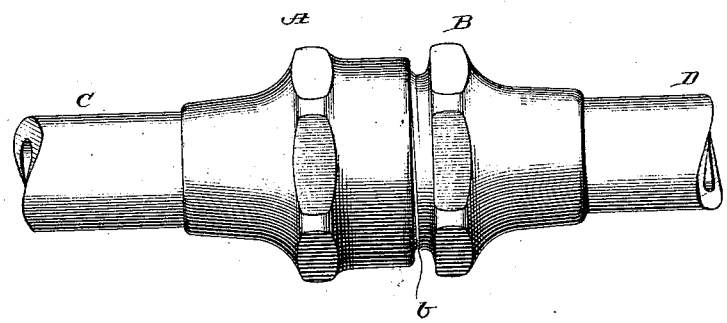
Figure 2:
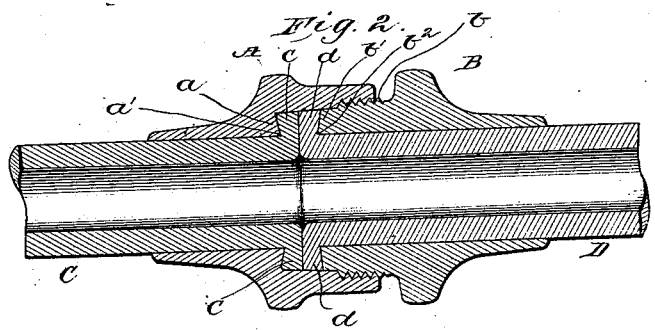

Figure 1 shows two pieces of pipe united by my improved coupling. Fig. 2 is a longitudinal section of the pipe and coupling shown in Fig. 1.

My improved coupling is composed of two parts A B, one threaded internally to engage external screw-threads of the other. The part A has a shoulder $a$, preferably so shaped as to leave a corner $a'$, the inclination of the shoulder being, as shown, such as to present an acute-angled corner. The part B of the coupling having the external thread $b$ is terminated by a shoulder $b'$, preferably at such an inclination to the inner wall of the part B as to leave an acute-angled corner $b^2$.

To use my coupling, I slip over the free ends of the lead pipes C D to be joined the parts A and B, and by a suitable tool I expand and overturn the ends of each pipe, to thus provide each with a flange, as $c$ $d$. I may then move the part A on the pipe C until the shoulder $a$ contacts with the flange $c$. I may then insert the flanged end $d$ of pipe D into the internally-threaded chamber at the outer end of the part A until the flanges contact, or substantially so, and then I engage the externally-threaded end $b$ of the part B with the internal threads of the part A and turn, preferably, the part B by means of a suitable wrench, causing it to act against the flange $d$ and force its face closely against the face of the flange $c$, the two faces being formed one against the other, and the outer sides of the flanges being seated against the shoulders, as represented in Fig. 2, the pressure being sufficient, preferably, to cause the edges of said flanges to contact with the inner wall of the chamber having the internal screw-thread and sufficient to force together and flatten the faces of said flanges, so that they make a gas and fluid tight joint.

I believe that I am the first to make a gas and fluid tight joint in lead pipe by forcing the faces of the flanges at the meeting ends of the two pipes so closely together as to mold one flange to another and make an absolutely tight joint.

Viewing Fig. 2, it will be seen that the space between the inner end of the screw-threaded portion of the part A of the coupling and the shoulder $a$ is smooth or without screw-threads and that said smooth surface is tapered inwardly toward the said shoulder, and the smooth surface is of a length substantially equal to the thickness of the two flanges, so that the edges of said flanges are left smooth in the condition in which they are formed by a suitable tool, as stated, before uniting the two parts of the coupling. The acting of the corners $a$ and $b^2$ on the lead pipe has a tendency to force the edges of the flanges closely against the inner smooth wall of the part A of the coupling, and by tapering said wall the part A may be slid back on the pipe, if necessity requires, and the flange $d$ be withdrawn without breaking the same on the screw-thread.

In another application, Serial No. 40,658, filed on the 21st day of December, 1900, I have shown one of the coupling members herein illustrated as employed to couple a lead pipe with a valve or other externally-threaded part, a nut intervening between the valve and the movable member of the coupling.

Having described my invention, what I claim as new, and desire to secure by Letters Patent, is—

1. In a pipe-coupling, an internally-screw-threaded part having an acute-angled shoulder, an externally-screw-threaded part having a shoulder opposed to and coöperating with the acute-angled shoulder of the internally-screw-threaded part to clamp between them the outturned flanges of two metallic pipes and force said flanges together and outward to form a gas and fluid tight joint between the faces of the flanges and also between the edges of said flanges and one of the parts of the coupling.

2. In a pipe-coupling, an internally-screw-threaded part having a shoulder presenting an acute angle, an externally-screw-threaded part having a shoulder presenting an acute angle and opposed to and coöperating with the shoulder of the internally-screw-threaded part to clamp between them the outturned flanges of two metallic pipes and force said flanges together and outward against one of the parts of the coupling to form a gas and fluid tight joint between the faces of the flanges and also between the edges of the flanges and one of the parts of the coupling.

3. In a pipe-coupling, an externally-threaded part having a shoulder, and internally-threaded part also having a shoulder, the shoulders of said parts being acute-angled to clamp between them and force outwardly the outward-turned flanges of two pipes to be joined, the screw-threads on said parts being omitted adjacent the edges of said flanges to present a smooth surface against which the material at the edges of the flanges may be forced.

4. In a pipe-coupling, exterior and interior screw-threaded parts each having a shoulder to clamp between them the outturned flanges of two pipes to be joined, one of said parts having a chamber the walls of which taper inwardly toward the shoulder, to form a smooth inclined bearing-surface for the edges of said flanges, and means to cause said shoulders to clamp said flanges gas and fluid tight within said coupling.

5. In a pipe-coupling, exterior and interior screw-threaded parts having acute-angled shoulders to clamp between them the outturned flanges of two pipes to be joined, one of said parts having a chamber the walls of which taper inwardly toward the shoulder, to form a smooth inclined bearing-surface for the edges of said flanges, and means to cause said acute-angled shoulders to clamp said flanges gas and fluid tight within said coupling.

6. In a pipe-coupling, an internally-screw-threaded part having an acute-angled shoulder, and an externally-screw-threaded part having an acute-angled shoulder to clamp between them the outturned flanges of two pipes to be joined, the internally-screw-threaded part having the screw-threads omitted adjacent the edges of said flanges to present a smooth surface against which the edges of the flanges may be forced to form a tight joint between the faces of the flanges and between the edges of the flanges and the wall of the chamber.

7. In a pipe-coupling, an internally-screw-threaded part having an internal shoulder tapered outwardly to sustain the under side of a flange at the end of a lead pipe, and an externally-threaded member having at its end an outwardly-tapered shoulder to sustain the under side of a flange of a second piece of pipe, the rotation of said members causing the faces of said flanges to be clamped together gas and fluid tight, the rotation of said parts about the lead pipe in clamping said flanges causing said shoulders traveling over said flanges to expand the same outwardly.

In testimony whereof I have signed my name to this specification in the presence of two subscribing witnesses.

CHARLES LUKE.

Witnesses:
H. G. THOMPSON,
GEORGE E. HAIGHT.

Correction in Letters Patent No. 675,335.

It is hereby certified that in Letters Patent No. 675,335, granted May 28, 1901, upon the application of Charles Luke, of Milford, Connecticut, for an improvement in "Pipe-Couplings," an error appears in the printed specification requiring the following correction, viz: In line 47, page 2, the clause "shoulders of said parts," should read *shoulder on one of said parts*; and that the said Letters Patent should be read with this correction therein that the same may conform to the record of the case in the Patent Office.

Signed, countersigned, and sealed this 11th day of June, A. D., 1901.

[SEAL.]

F. L. CAMPBELL,
*Assistant Secretary of the Interior.*

Countersigned:
F. I. ALLEN,
*Commissioner of Patents.*